United States Patent
Kerschbaum et al.

(10) Patent No.: US 8,291,509 B2
(45) Date of Patent: Oct. 16, 2012

(54) SEARCHABLE ENCRYPTION FOR OUTSOURCING DATA ANALYTICS

(75) Inventors: Florian Kerschbaum, Karlsruhe (DE); Alessandro Sorniotti, Antibes (FR)

(73) Assignee: SAP AG, Walldorf (DE)

( * ) Notice: Subject to any disclaimer, the term of this patent is extended or adjusted under 35 U.S.C. 154(b) by 570 days.

(21) Appl. No.: 12/510,598

(22) Filed: Jul. 28, 2009

(65) Prior Publication Data
US 2010/0114964 A1    May 6, 2010

Related U.S. Application Data

(63) Continuation-in-part of application No. 12/253,616, filed on Oct. 17, 2008.

(51) Int. Cl.
*H04L 29/08* (2006.01)
*G06F 21/24* (2006.01)

(52) U.S. Cl. .......................... 726/30; 713/185

(58) Field of Classification Search .................. None
See application file for complete search history.

(56) References Cited

U.S. PATENT DOCUMENTS

| | | |
|---|---|---|
| 6,754,819 B1 | 6/2004 | Wootten et al. |
| 7,665,132 B2 | 2/2010 | Hisada et al. |
| 7,685,437 B2 | 3/2010 | Hacigumus et al. |
| 2001/0034719 A1 | 10/2001 | Durand et al. |
| 2003/0070092 A1 | 4/2003 | Hawkes et al. |
| 2005/0138404 A1 | 6/2005 | Weik et al. |
| 2005/0289639 A1 | 12/2005 | Leung |
| 2006/0041533 A1 | 2/2006 | Koyfman |
| 2006/0090198 A1 | 4/2006 | Aaron |
| 2006/0143702 A1 | 6/2006 | Hisada et al. |
| 2008/0133935 A1 | 6/2008 | Elovici et al. |
| 2008/0183656 A1 | 7/2008 | Perng et al. |
| 2008/0195592 A1 | 8/2008 | Kelley et al. |
| 2008/0196108 A1 | 8/2008 | Dent et al. |
| 2010/0010968 A1 | 1/2010 | Redlich et al. |
| 2010/0070758 A1 | 3/2010 | Low et al. |
| 2010/0106980 A1 | 4/2010 | Kerschbaum et al. |
| 2010/0174848 A1 | 7/2010 | Hana et al. |
| 2010/0192208 A1 | 7/2010 | Mattsson |
| 2011/0078650 A1 | 3/2011 | Weber et al. |

OTHER PUBLICATIONS

Conjunctive, Subset, and Rnage Queries on Encrypted Data. Boneh et al. 2007.*
Brent Waters Universitat Trier.(//Establishing proof of 2007 date//).*
AICPA, "Consideration of Fraud in a Financial Statement Audit" AU Section 316.02, Source: Statement on Auditing Standards(SAS) No. 99 and 113. ACPA042-p271-300, Jul. 16, 2008, pp. 277-328.

(Continued)

Primary Examiner — Venkat Perungavoor
(74) Attorney, Agent, or Firm — Brake Hughes Bellermann LLP (57) ABSTRACT

A method for performing data analytics on outsourced data may include generating, by a data owner, a binary tree representing data from the data owner, where each node of the binary tree is associated with an identity that represents a data element or an interval of data elements, computing, by the data owner, an identity token and encrypting the identity token for each of the identities in the binary tree, generating a range query token using an identity selected by a data analyst and a secret key input by the data owner and computing a decryption key for the selected identity, and analyzing the data, by the data analyst, by comparing the computed decryption key for the selected identity with each of the encrypted identities.

20 Claims, 5 Drawing Sheets

OTHER PUBLICATIONS

Agrawal, Rakesh et al., "Order Preserving Encryption for Numeric Data", Proceedings of the ACM SIGMOD International Conference on Management, Jun. 13-18, 2004, pp. 563-574.
Boneh, Dan et al., "Public Key Encryption with keyword Search", In Proceedings of Eurocrypt 2004, LNCS 3027, 2004, 17 pages.
Cachin, Christian et al., "Computationally Private Information Retrieval with Polylogarithmic Communication", International Conference on the Theory and Application of Cryptographic Techniques—EUROCRYPT, Jul. 12, 1999, pp. 402-414.
Chang, Yan-Cheng et al., "Privacy Preserving Keyword Searches on Remote Encrypted Data", Proceedings of the Third International Conference on Applied Cryptography and Network Security, 2005, pp. 442-455.
Chor, Benny et al., "Private information Retrieval", IEEE Symposium, Jun. 29, 1997, 21 pages.
Curtmola, Reza et al., "Searchable Symmetric Encryption: Improved Definitions and Efficient Constructions", ACM Conference on Computer and Communications Security, 2006, 26 pages.
Evdokimov, Sergei et al., "Encryption Techniques for Secure Database Outsourcing", Proceedings of 12th European Symposium on Research in Computer Security, ESORICS, Sep. 2007, 23 pages.
Goh, Eu-Jin, "Secure Indexes", Cryptology ePrint Archive on Oct. 7, 2003, Mar. 16, 2004, 18 pages.
Goldreich, Oded, "Secure Multi-Party Computation", Final (Incomplete) Draft , Version 1.4, Oct. 27, 2002, 110 pages.
Goldreich, Oded et al., "Software Protection and Simulation on Oblivious RAMs", Journal of ACM, vol. 43, No. 3, 1996, pp. 431-473.
Hacigumus, Hakan et al., "Executing SQL over Encrypted Data in the Database-Service-Provider Model", Proceedings of the ACM SIGMOD International Conference on Management of Data, Jun. 4-6, 2002, pp. 216-227.
Hore, Bijit et al., "A Privacy-Preserving Index for Range Queries", Proceedings of the 30th Very large data bases Conference, 2004, 15 pages.
Kushilevitz, Eyal et al., "Replication is Not Needed: Single Database, Computationally-Private Information Retrieval.", IEEE Symposium on Foundations of Computer Science, 1997, pp. 364-373.
Lenstra, Arjen K., et al., "Selecting Cryptographic Key Sizes", Journal of Cryptology, 2001, 42 pages.
Sion, Radu et al., "On the Computational Practicality of Private Information Retrieval", Proceedings of Network and Distributed Systems Security Symposium, Stony Brook Network Security and Applied Cryptography Lab Tech Report, 2007, 10 pages.
Snow, Brian, "We Need Assurance!", Proceedings of the 21st Annual Computer Security Applications Conference, IEEE Computer Society, 2005, 7 pages.
Ateniese, Giuseppe et al., "Secret Handshakes with Dynamic and Fuzzy Matching", Proceedings of the Network and Distributed System Security Symposium, NDSS, 2007, pp. 159-177.
Boneh, Dan et al., "Hierarchical Identity Based Encryption with Constant Size Ciphertext", In proceedings of Eurocrypt, Cryptology ePrint Archives [3], 2005, pp. 440-456.
Boneh, Dan et al., "Identity-Based Encryption from the Weil Pairing", SIAM Journal of Computing, vol. 32, No. 3, 2003, 31 pages.
Golle, Philippe et al., "Secure Conjunctive Keyword Search Over Encrypted Data", Second International Conference on Applied Cryptography and Network Security, 2004, 15 pages.
Kerschbaum, Florian et al., "Privacy-Preserving Data Analytics as an Outsourced Service", Proceedings of the ACM Workshop on Secure web Services, Oct. 31, 2008, pp. 87-96.
Waters, Brent, "Efficient Identity-Based Encryption Without Random Oracles", Advances in Cryptology—EUROCRYPT, 2005, 13 pages.
Yang, Zhiqiang et al., "Privacy-Preserving Queries on Encrypted Data", In Proceedings of the 11th European Symposium on Research in Computer Security, 2006, 18 pages.
Vanasco, Rocco R., "Fraud auditing", Technical paper, Managerial Auditing Journal, vol. 13, No. 1, 1998, 147 pages.
U.S. Appl. No. 12/253,616, filed Oct. 17, 2008.
Office Action for U.S. Appl. No. 12/253,616, mailed on Jul. 12, 2011, 23 pages.
Boneh, Dan et al., "Conjunctive, Subset, and Range Queries on Encrypted Data", In proceedings of TCC'07, LNCS 4392, (2007), pp. 535-554.
Boneh, Dan et al., "Public Key Encryption that Allows PIR Queries", In Proceedings of CRYPTO (2007) (Feb. 23, 2006), pp. 1-14.
Shi, Elaine et al., "Multi-Dimensional Range Query over Encrypted Data", Proceedings of the 2007 IEEE Symposium on Security and Privacy, (2007), pp. 350-364.
Abdalla, Michel et al., "Searchable Encryption Revisited: Consistency Properties, Relation to Anonymous IBE, and Extensions", In CRYPTO, (Jul. 2005), pp. 1-43.
Final Office Action for U.S. Appl. No. 12/253,616, mailed Aug. 6, 2012, 21 pages.

* cited by examiner

SEARCHABLE ENCRYPTION FOR OUTSOURCING DATA ANALYTICS

CROSS REFERENCE TO RELATED APPLICATIONS

This application is a continuation-in-part of U.S. patent application Ser. No. 12/253,616, filed on Oct. 17, 2008, entitled "Searchable Encryption For Outsourcing Data Analytics," which is hereby incorporated by reference in its entirety.

TECHNICAL FIELD

This description relates to searchable encryption for outsourcing data analytics.

BACKGROUND

Protecting the privacy and confidentiality of data may be desirable and important for a company or an organization. However, sometimes the company or organization may need to make their sensitive data available to third parties. For example, during a financial audit, the company or organization may need to make their data available to a financial auditor. In this example scenario, two sets of privacy issues may need to be considered when a company's accounting data is audited by an external party. The company wants to safeguard its data, while the auditors want to safeguard their investigation methods.

Thus, multiple parties may have privacy and confidentiality concerns regarding their data and their methods. In the example provided above, the company wants to preserve the privacy of the data it lets the auditor access for the purpose of the audit. On the other hand, what makes the auditor effective and efficient in his work are the queries he runs, which are his know-how and intellectual property. The challenge is therefore to ensure both the privacy of the data and the privacy of the queries.

SUMMARY

In general, this document describes a searchable encryption system and techniques for protecting the data of multiple parties. This document provides exemplary scenarios and contexts for implementing and using the searchable encryption system and techniques. However, these exemplary scenarios and uses are not meant to limit the scenarios and contexts in which the searchable encryption system and techniques may be used. For example, this document describes an exemplary context for the searchable encryption system and techniques for outsourcing data analytics. In this exemplary context, a data owner desires to encrypt his data only once and communicate the data in encrypted form to a data analyst. The data analyst can then perform a series of queries for which the data analyst works with the data owner for help in translating the constants in the queries.

The searchable encryption system and techniques allows keyword searches and range queries. Furthermore, additional queries may reuse the results of previous queries as tokens and thereby make dependent queries without interaction between the data owner and the data analyst. The searchable encryption system and techniques may be provably secure.

According to one general aspect, a method for performing data analytics on outsourced data may include receiving, at a data analyst, cipher text representing data from a data owner such that the data remains hidden from the data analyst, generating a query token using a constant provided by the data analyst such that the constant remains hidden from the data owner, and analyzing the cipher text using the query token.

Implementations may include one or more of the following features. For example, the method may further include outputting one or more identity query tokens as a result of analyzing the cipher text, analyzing the cipher text using the outputted identity query tokens, and outputting additional identity query tokens. The data may include one or more tuples and the cipher text may be generated by the data owner encrypting the tuples using a secret key and a corresponding public security parameter such that the cipher text is unique for each of the tuples.

Generating the query token may include inputting the constant and a public security parameter by the data analyst such that the constant remains hidden from the data owner, inputting a secret key by the data owner such that the secret key remains hidden from the data analyst and outputting the query token to the data analyst.

In one exemplary implementation, generating the query token may include generating a set of range query tokens using constants provided by the data analyst such that the constants remain hidden from the data owner and analyzing the cipher text comprises analyzing the cipher text using the set of range query tokens. The method may further include outputting one or more identity query tokens as a result of analyzing the cipher text, analyzing the cipher text using the outputted identity query tokens and outputting additional identity query tokens.

In another general aspect, a system for performing data analytics on outsourced data may include an encryption generator that is arranged and configured to encrypt data from a data owner, output a cipher text and communicate the cipher text to a data analyst such that the data remains hidden from the data analyst, a query generator that is arranged and configured to generate a query token using a constant provided by the data analyst such that the constant remains hidden from the data owner and an analysis engine that is arranged and configured to analyze the cipher text using the query token.

Implementations may include one or more of the following features. For example, the analysis engine may be arranged and configured to output one or more identity query tokens as a result of analyzing the cipher text, analyze the cipher text using the outputted identity query tokens and output additional identity query tokens. The data may include one or more tuples and the encryption generator encrypts the tuples using a secret key and a corresponding public security parameter such that the cipher text is unique for each of the tuples. The query generator may be arranged and configured to generate the query token by receiving the constant and a public security parameter from the data analyst such that the constant remains hidden from the data owner, receiving a secret key from the data owner such that the secret key remains hidden from the data analyst and outputting the query token to the data analyst.

In one exemplary implementation, the query generator may be arranged and configured to generate a set of range query tokens using constants provided by the data analyst such that the constants remain hidden from the data owner and the analysis engine is arranged and configured to analyze the cipher text using the set of range query tokens. The analysis engine may be further arranged and configured to output one or more identity query tokens as a result of analyzing the cipher text, analyze the cipher text using the outputted identity query tokens and output additional identity query tokens.

In another general aspect, a computer program product for performing data analytics on outsourced data may be tangibly embodied on a computer-readable medium and include executable code that, when executed, is configured to cause a data processing apparatus to encrypt data from a data owner, output a cipher text and communicate the cipher text to a data analyst such that the data remains hidden from the data analyst, generate a query token using a constant provided by the data analyst such that the constant remains hidden from the data owner and analyze the cipher text using the query token.

Implementations may include one or more of the following features. For example, the executable code that, when executed, may cause the data processing engine to output one or more identity query tokens as a result of analyzing the cipher text, analyze the cipher text using the outputted identity query tokens and output additional identity query tokens.

The computer program product may include executable code that, when executed, causes the data processing engine to generate the query token by receiving the constant and a public security parameter from the data analyst such that the constant remains hidden from the data owner, receiving a secret key from the data owner such that the secret key remains hidden from the data analyst and outputting the query token to the data analyst.

In one exemplary implementation, the computer program product may include executable code that, when executed, causes the data processing engine to generate a set of range query tokens using constants provided by the data analyst such that the constants remain hidden from the data owner and analyze the cipher text using the set of range query tokens. The computer program product may further include executable code that, when executed, causes the data processing engine to output one or more identity query tokens as a result of analyzing the cipher text, analyze the cipher text using the outputted identity query tokens and output additional identity query tokens.

In one general aspect, a method for performing data analytics on outsourced data may include generating, by a data owner, a binary tree representing data from the data owner, where each node of the binary tree is associated with an identity that represents a data element or an interval of data elements, computing, by the data owner, an identity token and encrypting the identity token for each of the identities in the binary tree, generating a range query token using an identity selected by a data analyst and a secret key input by the data owner and computing a decryption key for the selected identity, and analyzing the data, by the data analyst, by comparing the computed decryption key for the selected identity with each of the encrypted identities.

Implementations may include one or more of the following features. For example, the method may include generating an identity query token using a constant selected by the data analyst and the secret key input by the data owner and computing the identity query token. The method may include analyzing the data, by the data analyst, by comparing the identity query token with each of the encrypted identities.

The method may further include outputting one or more identity query tokens as a result of analyzing the data and analyzing the data using the outputted identity query tokens. In one exemplary implementation, encrypting the identity token for each of the identities in the binary tree may use an identity-based encryption scheme. The identity-based encryption scheme may use hash functions that map strings onto group elements.

In another general aspect, a system for performing data analytics on outsourced data may include a key generator that is arranged and configured to generate a binary tree representing data from a data owner, where each node of the binary tree is associated with an identity that represents a data element or an interval of data elements, an encryption generator that is arranged and configured to compute an identity token and encrypt the identity token for each of the identities in the binary tree, a query generator that is arranged and configured to generate a range query token using an identity selected by a data analyst and a secret key input by the data owner and computing a decryption key for the selected identity and an analysis engine that is arranged and configured to analyzing the data by comparing the computed decryption key for the selected identity with each of the encrypted identities.

Implementations may include one or more of the following features. For example, the query generator may be arranged and configured to generate an identity query token using a constant selected by the data analyst and the secret key input by the data owner and compute the identity query token. The analysis engine may be further arranged and configured to analyze the data by comparing the identity query token with each of the encrypted identities. The analysis engine may be further arranged and configured to output one or more identity query tokens as a result of analyzing the data.

The encryption generator may be arranged and configured to encrypt the identity token for each of the identities in the binary tree using an identity-based encryption scheme. The identity-based encryption scheme may use hash functions that map strings onto group elements.

In another general aspect, a computer program product for performing data analytics on outsourced data may be tangibly embodied on a computer-readable medium and include executable code that, when executed, is configured to cause a data processing apparatus to generate a binary tree representing data from a data owner, where each node of the binary tree is associated with an identity that represents a data element or an interval of data elements, compute an identity token and encrypting the identity token for each of the identities in the binary tree, generate a range query token using an identity selected by a data analyst and a secret key input by the data owner and compute a decryption key for the selected identity and analyze the data by comparing the computed decryption key for the selected identity with each of the encrypted identities.

Implementations may include one or more of the following features. For example, the computer program product may include executable code that, when executed, causes the data processing engine to generate an identity query token using a constant selected by the data analyst and the secret key input by the data owner and compute the identity query token. The computer program product may include executable code that, when executed, causes the data processing engine to analyze the data by comparing the identity query token with each of the encrypted identities.

The computer program product may include executable code that, when executed, causes the data processing engine to output one or more identity query tokens as a result of analyzing the data and to analyze the data using the outputted identity query tokens. The computer program product may cause the data processing engine to encrypt the identity token for each of the identities in the binary tree uses an identity-based encryption scheme. The identity-based encryption scheme may use hash functions that map strings onto group elements.

The details of one or more implementations are set forth in the accompanying drawings and the description below. Other features will be apparent from the description and drawings, and from the claims.

DETAILED DESCRIPTION

Figure 1:
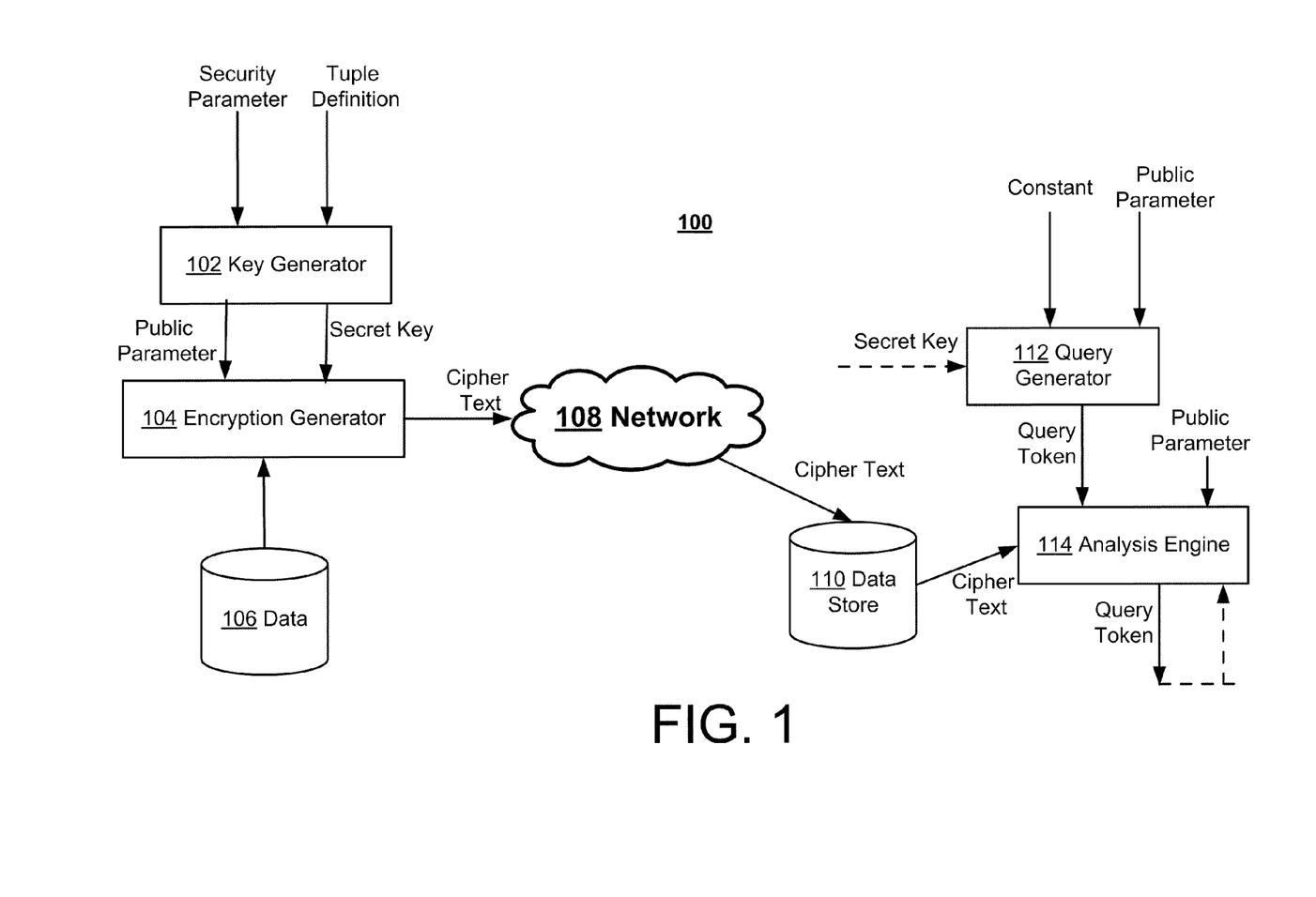
FIG. 1 is an exemplary block diagram for a searchable encryption system.

FIG. 1 is an exemplary block diagram of a search encryption system 100. The system 100 may include a key generator 102, an encryption generator 104, a data store 106, a network 108, a data store 110, a query generator 112, and an analysis engine 114. The searchable encryption system 100 may be used to protect the data of multiple different parties such that the data of each respective party remains hidden from the other parties. At the same time, the system 100 enables the parties to interact with each other's data in a secure manner to accomplish their respective goals and/or tasks. For example, the system 100 enables a data owner to encrypt their data and send the data in encrypted form to a data analyst. The data analyst can then search the encrypted data such that the data remains hidden from the data analyst and at the same time keep their own search techniques and methodologies hidden from the data owner. In this manner, the data analyst can conduct a remote or outsourced financial audit using the data from the data owner without the data analyst having to physically go to the data owner's site to protect the security of the data. Since the data is encrypted, it remains secure during transmission from the data owner to the data analyst and it remains secure while being searched by the data analyst.

More specifically, in the context of a financial audit, the job of a financial auditor is to analyze a set of data (e.g., accounting documents) in order to establish that these documents are a fair representation of the business conducted by the data owner (e.g., the company being audited). In addition, a financial auditor may also be asked to look for indicators of fraud, waste and/or abuse.

From an abstract point of view, the auditor may query the accounting data and analyze the results. Even though a large amount of queries may be generated in the course of an audit, the final outcome of the audit can be as small as a few paragraphs in the company's annual report. For reporting purposes, a final report may detail the result and not the means or methods of how the results were obtained. In this context, the system 100 enables the goals of both parties to be met.

The key generator 102 may be arranged and configured to receive a security parameter, k, and a data definition, $\Gamma$, and to output a secret key, SK, and a public parameter, PP. In one exemplary implementation, the key generator 102 may choose primes p, q, and o, $p=2q+1=4o+3$, such that $o>\tau$, that the DDH problem is assumed to be infeasible in $G_q^*$ and that the DL problem is assumed to be infeasible in $G^*_p$. The key generator 102 may randomly select two secret keys $x_<$ and $x_=$ from $Z_q^*$. The key generator 102 may further randomly select a group element g from $Z^*_p$ of order 2q (a generator of $Z^*_p$). The public parameter PP is p and g. In this manner, the data owner may keep the secret key secret and may share the public parameter PP with others including the data analyst.

The key generator 102 may be implemented as software, hardware, or a combination of hardware and software. In one exemplary implementation, the key generator 102 may be implemented as a computer program product embodied on a tangible medium.

In the example context of the data owner and the data analyst, the key generator 102 may be a component that is controlled and operated by the data owner. In this manner, the data owner can generate the secret key and keep the key hidden from other parties since it is the secret key that will be used to encrypt the data owner's data.

The encryption generator 104 may be arranged and configured to use the secret key, SK, the public parameter, PP, to encrypt one or more rows of data, t, from data 106 and to output cipher text, C. In one exemplary implementation, the encryption generator 104 creates a ciphertext $$\beta = c^{2x_=} \bmod q$$

For each $d \in D$ the encryption generator 104 may randomly select an element r in $Z_q^*$ and an element r' in $Z_p^*$ and computes $$\gamma = d^{2x_<} \bmod q$$

$$e = g^{2r} \bmod p$$

$$e' = \begin{cases} \beta^2 g^{2r\gamma} \bmod p & \text{if } c < d \\ r' & \text{otherwise} \end{cases}$$

Let $(e_j, e'_j)$ be the encryption (e,e') for $d_j \in D$ as described above. Then, let $\mathcal{E}_< = (e_1, e'_1), (e_2, e'_2), \ldots, (e_\tau, e'_\tau)$ be the encryption for the entire "smaller-than" range query. The encryption generator 104 may choose a random permutation $\Pi_<$ of $[1,\tau]$. Let $C_<$ be an element-wise permutation of the encryptions of $\mathcal{E}_<$ according to $\Pi_<$.

Let $\Pi$ be a fixed random permutation of $Z_q^*$ known to the data owner and analyst and $\Pi(a)$ be the element at position a in the permutation. The encryption generator 104 may use, for example, a cryptographic hash function of equal bit length. The function does not have to be one-way or trap-door. Again, for each $d \in D$ the encryption generator 104 may randomly select an element r in $Z_q^*$, and an element r' in $Z_p^*$ and compute $$\gamma = d^{2x_<} \bmod q$$

$$e = g^{2r} \bmod p$$

$$e' = \begin{cases} \Pi(\beta)^2 g^{2r\gamma} \bmod p & \text{if } c > d \\ r' & \text{otherwise} \end{cases}$$

Let $(e_j, e'_j)$ be the encryption (e,e') for $d_j \in D$, as described above. Then, let $\mathcal{E}_> = (e_1, e'_1), (e_2, e'_2), \ldots, (e_\tau, e'_\tau)$ be the encryption for the entire "greater-than" range query. The encryption generator 104 may choose another random permutation $\Pi_>$ of $[1,\tau]$. Let $C_>$ be an element-wise permutation of the encryptions of $\mathcal{E}_>$ according to this permutation $\Pi_>$ of the "greater-than" range queries.

For identity queries, the encryption generator 103 may randomly selects two elements r and r' in $Z_q^*$, and computes $$e = g^{2r} \bmod p$$

$$e' = \beta^2 g^{2r\beta} \bmod p$$

Let $C_==(e,e')$ be the encryption for the identity query.

The cipher text C for the entire tuple t is $C=C_<, C_>, C_=$.

The encryption generator 104 may be implemented as software, hardware, or a combination of hardware and software. In one exemplary implementation, the encryption generator 104 may be implemented as a computer program product embodied on a tangible medium.

In the example context of the data owner and the data analyst, the encryption generator 104 may be a component that is controlled and operated by the data owner. In this manner, the data owner can generate the cipher text using the secret key and keep the key hidden from other parties since it is the secret key that needs to be used to decrypt the data owner's data.

The cipher text C may be communicated over the network 108 from the data owner to another party such as, for example, the data analyst. The cipher text may be stored in a data store 110 for future use by the analysis engine 114. The network 108 may include any type of wired and/or wireless network. The network 108 may include a combination of networks including one or more local area networks (LANs) and/or wide area networks (WANs) including, for example, the Internet. Since the cipher text is an encrypted form of the data, the network itself does not necessarily need to be a secure network. The network 108 may be configured to support any type of protocols suitable for the communication of data including, for example, any type of Internet-related protocol.

The query generator 112 may be arranged and configured to generate a query token using a constant provided by the data analyst such that the constant remains hidden from the data owner. The query generator 112 may generate different types of query tokens including, for example, range query tokens and identity query tokens. The range query tokens may be used by the analysis engine 114 to conduct range searches on the cipher text. The identity query tokens may be used by the analysis engine 114 to conduct more specific searches on the cipher text.

The inputs to the query generator 112 include the secret key, SK, that is input by the data owner, a constant that is input by the data analyst and the public parameter, which may be input by either party. The query generator 112 is configured such that the secret key remains hidden from the data analyst and the constant remains hidden from the data owner. The output of the query generator 112 is a query token, which may be a range query token or an identity query token. The type of query token outputted by the query generator 112 may depend on the type of constant input by the data analyst. The output from the query generator 112 may be configured to go just to the data analyst and not to the data owner. The data analyst may use the output of the query generator 112 as input to the analysis engine 114.

The query generator 112 may perform its operations to generate and output query tokens either prior to or after the encryption generator 104 has performed its operations on the data to generate the cipher text. The operation of the query generator 112 is not dependent on the operation or results of the encryption generator 104.

In one exemplary implementation, the query generator 112 may output range query tokens. The process to generate range query tokens may be referred in this document as PrepareRangeQuery. The PrepareRangeQuery operation is an interactive, privacy-preserving protocol between the data owner, DO, and the data analyst, DA. The data analyst has as input to the query generator 112 a constant rc (we can drop the superscript i, since we assume one-dimensional tuples) that the DA wishes to use in a range query as upper or lower bound. The query generator 112 chooses a random element r in $Z_{q-1}^*$ such that r has a multiplicative inverse $r^{-1}$ in $Z_{q-1}^*$, i.e. $rr^{-1} \mod(q-1)=1$, and the following is communicated over the network 112 to the data owner:

$$DA \rightarrow DO: rc^{2r} \mod q$$

The data owner has as input to the query generator 112 the secret key SK and in particular $x_{<\ >}$. The following is communicated to the data analyst over the network 112:

$$DO \rightarrow DA: (rc^{2r})^{x_{<\ >}} = rc^{2rx_{<\ >}} \mod q$$

The query generator 112 then computes for the data analyst:

$$DA: RQ = (rc^{2rx_{<\ >}})^{r^{-1}} = rc^{2x_{<\ >}} \mod q$$

Note that the range query token RQ corresponds to the intermediate key γ in the encrypt operation performed by the encryption generator 104. The data analyst outputs RQ; the data owner has no output. During the protocol, loosely speaking, the data analyst has learnt nothing about $x_{<\ >}$ and the data owner has learnt nothing about rc.

In another exemplary implementation, the query generator 112 may generate and output identity query tokens. The PrepareIdentityQuery operation is the duplicate of PrepareRangeQuery for identity queries. The data analyst has as input a constant is he wishes to use in an identity query. The data owner has as input the secret key SK, in particular $x_=$. The data analyst has as output an identity query token IQ and the data owner has no output. The data analyst chooses a random element r in $Z_{q-1}^*$, such that r has a multiplicative inverse $r^{-1}$ in $Z_{q-1}^*$, i.e. $rr^{-1} \mod(q-1)=1$ and the protocol proceeds as follows:

$$DA \rightarrow DO: rC^2r \mod q$$

$$DO \rightarrow DA: (rc^2r)^{x_=} = rc^{2rx_=} \mod q$$

$$DA: IQ = (rc^{2rx_=})^{r^{-1}} = rc^{2x_=} \mod q$$

The query generator 112 may be implemented as software, hardware, or a combination of hardware and software. In one exemplary implementation, the query generator 112 may be implemented as a computer program product embodied on a tangible medium. In one exemplary implementation, the query generator 112 may be divided into multiple components with one of the components accessible to the data owner and another of the components accessible to the data analyst. In this manner, the data owner and the data analyst may each access a portion of the query generator 112 to input their respective information.

The analysis engine 114 may be arranged and configured to analyze the cipher text using one or more of the query tokens. The analysis engine 114 enables the data analyst to conduct range query searches and identity query searches on the cipher text. In one exemplary implementation, the analysis engine 114 receives as input the query tokens outputted by the query generator 112, the public parameter, and the cipher text. The analysis engine 114 searches the cipher text using the query tokens. The analysis engine 114 may be configured to output additional query tokens.

In one exemplary implementation, the analysis engine 114 is configured to receive range query tokens or identity query tokens and to output identity query tokens. The outputted identity query tokens may then be used as input to the analysis engine 114 such that additional searches may be performed on the cipher text using the outputted tokens. In this manner, the results of the analysis engine 114 may be used to conduct additional searches against the cipher text. At the same time, the search constants and the search methodologies of the data analyst remain protected as they are not decipherable by the data owner.

A query language may be defined to enable the data analyst to query the data in the form of the cipher text. Let $t=(d^1, d^2, \ldots, d^n)$ be a n-tuple (row) in the ledger data. Denote $t.d^i$ the i-th data item of row t. In one exemplary implementation, a flattened, non-normalized form of the data may be considered, where all data tables have been condensed into one flat table. However, other forms of data may be used. Let $c^i$ be any constant query string for $t.d^i$. The grammar G for a query expression expr is as follows:

$$expr := expr \wedge expr | expr \vee expr | sexpr$$

$$sexpr := t.d^i opc^i | t.d^i ops\ t'.d^i$$

$$op := ops | < | >$$

$$ops := ==$$

This grammar implies range queries ($c^i < t.d^i \wedge t.d^i < c^{i\prime}$ ($c^i < c^{i\prime}$)) and keyword searches ($c^i == t.d^i$). The expression expr t may be written if expr matches the record t. The footprint (RC,IC,FK) of an expression expr is its set RC of used constants in range queries, its set IC of used constants in identity queries and its set FK of used foreign fields or keys. For instance, the query expression $t.d^1 > 2 \wedge t.d^1 < 6 \wedge t.d^2 == 4 \wedge t.d^3 == t'd^3$ has the footprint $(\{2,6\}, \{4\}, \{t'.d^3\})$.

The language includes an important feature of the encryption scheme: comparing for equality the data items of two tuples. If a query has returned a set of tuples, each data item in this tuple can be used in subsequent keyword searches without loss of privacy. This may be referred to as query result reusability.

The system 100 provides the advantage that the queries are not revealed to the encrypting party. Nevertheless the querying party can search for any range it chooses. Thus, the process to generate the query tokens by translating constants into the query tokens may be an interactive protocol, that does not reveal its inputs. The query token protocol for the querier is a privacy-preserving protocol that protects the constant from the encrypting party (and the secret key from the querier). The encryption scheme preserves the privacy of the query.

In one exemplary implementation, the data (e.g., tuple t) may be assumed to be one-dimensional and range queries $expr := c > rc \wedge c < rc'$ or identity queries $expr := c == ic$ may be used to search against the cipher text. It must be ensured that the footprint of expr, i.e. the range query tokens RQ and RQ' for rc and rc' and the identity query token IQ for ic, is in the set RQ and IQ, respectively.

Let $y = x^2 \mod p$ be a quadratic residue modulo p. Then $x' = y^{o+1} \mod p$ is a square root of y and the other square root is $x'' = p - x'$. Let $*\sqrt{y} = \min(x', x'')$ be the smaller square root. Note that $*\sqrt{y} \leq q$.

Recall that $RQ = rc^{2x<}$. A range query expr proceeds as follows: Let $C_> = (e_1, e'_1), (e_2, e'_2), \ldots, (e_\tau, e'_\tau)$ be the "smaller-than" range query part of C. For each $(e_i, e'_i)$ (with $i=1, 2, \ldots, \tau$) the analysis engine 114 computes $$\zeta_i = *\sqrt{\frac{e'_i}{e_i^{RQ}}} \mod p$$

Let $C_> = (e_1, e'_1), (e_2, e'_2), \ldots, (e_\tau, e'_\tau)$ be the "greater-than" range query part of C. For each $(e_i, e'_i)$ (with $i=1, 2, \ldots, \tau$) the analysis engine 114 computes $$\eta_i = *\sqrt{\frac{e'_i}{e_i^{RQ'}}} \mod p$$

Recall that $\Pi$ is a fixed random permutation of $Z_q^*$. If $\Pi(\zeta_i) = \eta_j$, for any $i,j \in [1,\tau]$, then the data analyst concludes that expr matches t.

An identity query $expr := c == ic$ proceeds as follows: Recall that $IQ = ic^{2x=}$. Let $C_= = (e, e')$ be the encryption for the identity query. The analysis engine 114 computes $$\theta = *\sqrt{\frac{e'}{e^{IQ}}} \mod p$$

If $\theta = IQ$, then the data analyst concludes that expr matches t.

The system 100 supports multi-dimensional database tuples of the form $t = (c^1, c^2, \ldots, c^n)$. In the Setup (k, $\Gamma$) operation, the data owner chooses n pairs of secret keys $x_{<>}^1, x^1, x_{<>}^2, x^2, \ldots, x_{<>}^n, x_=^n$. In the Encrypt(SK, t) operation the encryption generator 104 encrypts each $c^i$ with each secret key $x_=^j$ creating $$\beta_{i,j} = (c^i)^{2x_=^j} \mod q$$

The encryption generator 104 then creates intermediate ciphertexts $C_<$, $C_>$, and $C_=$, for each $\beta_{i,j}$ (under each domain element $d^i \in D^i$). The resulting ciphertext has size $O(Dn^2)$ and the secret key has size $O(n)$.

The analysis engine 114 in the Analyze(PP, C, RQ, IQ, expr) operation may use as input a query token for a specific element $c^i$ of the tuple. The goal may be to obtain an identity query token for element $t.d^j$. The data analyst then selects the cipher text part $C_{<,>,=}$ that encrypts $\beta_{i,j}$ (under the domain elements $d^i \in D^i$) and applies the described algorithm.

The procedure described above allows the data analyst to link every element with every other element. The data analyst can obtain an identity query token for any column by searching for elements in any other column. Not every database structure requires this, e.g. the following database relations $$d_1 \mapsto d^2 d^3\ d^3 \mapsto d^4 d^5$$

do not require the full search capability. Instead, it can be sufficient to be able to search for triples $(d^1, d^2, d^3)$ and $(d^3, d^4, d^5)$. The data owner can restrict the data analyst to a subset of possible searches by selectively not encrypting all $\beta_{i,j}$. In the example, all pairs that are not contained in any triple (e.g. $(d^1, d^4)$ and $(d^4, d^1)$) can be left out of the ciphertext. Obviously, this choice has to be communicated to the data analyst, such that he can make the right selection in the cipher text.

The system 100 supports the full grammar G and not only simple range or identity queries. The data analyst first breaks the query into simple queries of the form described connected by the binary operators $\wedge$ or $\vee$. The data analyst may use the query generator 112 to obtain range query tokens for virtual lowest $-\infty$ and upmost elements $\infty$ to augment range queries of the form $t.d^i < c^i$ or $t.d^i > c^i$ with $t.d^i > -\infty$ or $t.d^i < \infty$, respectively, that cannot be combined otherwise. In a first step, the data analyst then executes all simple range queries obtaining a result set $\Omega_j$ for each simple query expression $expr_j$.

As a second step, the data analyst combines the sets: For two query expressions expr and expr' connected by a $\wedge$ operation and the analysis engine 114 computes the combined result set $\Omega_\wedge = \Omega \cap \Omega'$. For two query expressions expr and expr' connected by a $\vee$ operation he computes the combined result set $\Omega_\vee = \Omega \cup \Omega'$. The final result set $\Omega^*$ that combines all query expressions is the result of the complex query.

The query language may be used for expressing some of the most common queries in fraud auditing. For example, a very common fraud pattern is employees misappropriating company funds by creating fake invoices and getting these invoices paid to themselves. In order to lower the risk of being caught, fraudsters commonly use two techniques. First, the amount of the fake invoice is kept just under the threshold above which an explicit approval from a manager would be required. In addition, fraudsters often create invoices for types of supplies that do not require a Goods Receipt (GR) document. This document is produced when physical goods are delivered to the company, and is required as a proof of delivery for triggering the payment of the invoice. However, for immaterial supplies such as services, no GR is produced, which weakens the invoice verification process. Assuming the threshold is $10,000 and amount is the field representing an invoice amount in a table row t of invoices paid by the company, the query could be:

$$t.\text{amount} > 9500 \wedge t.\text{amount} < 10000 \vee t.\text{GRRequired} == \text{false}$$

The above expression may be expressed informally as "give me all invoices with an amount $500 below the threshold and for which no Goods Receipt document is required".

A variation on the fraud pattern above is for a fraudster to create a fake storefront supplier and issue invoices for payment into an arbitrary bank account. Cases are documented where the fraudster used the same bank account as the one the company pays his salary into. If we assume a field invoiceBankAccount in a table row t of invoices and a field employeeBankAccount in a table row t' of employees, the query for the suspicious employee would be:

$$t.\text{employeeBankAccount} == t'.\text{invoiceBankAccount}$$

The above are just a couple of examples of queries that may be used to search the cipher text keeping the constants and the data secret.

Figure 2:
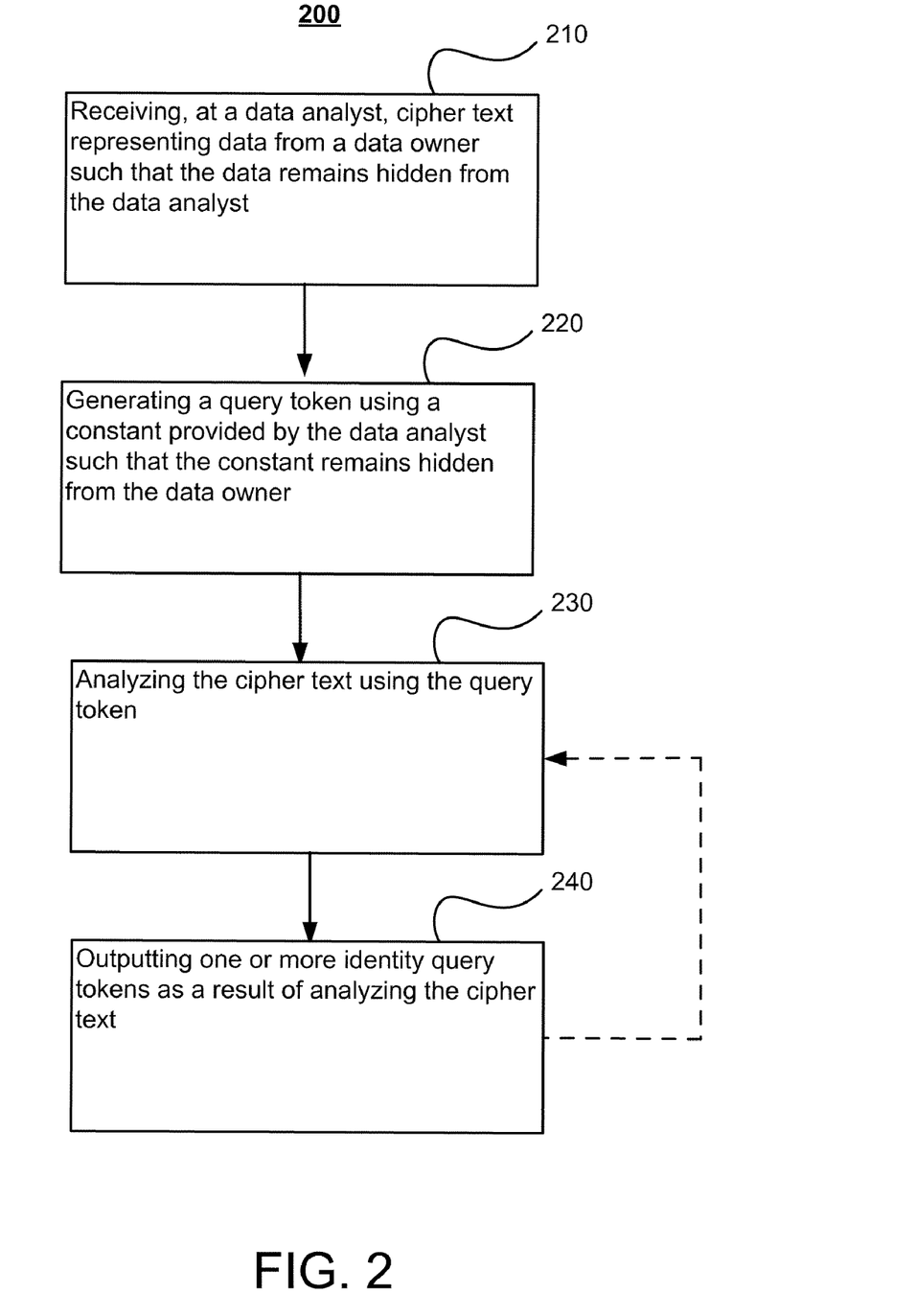
FIG. 2 is a flowchart illustrating example operations of the system of FIG. 1.

Referring to FIG. 2, an exemplary process 200 illustrates example operations of the system 100 of FIG. 1. Process 200 may include receiving, at a data analyst, cipher text representing data from a data owner such that the data remains hidden from the data analyst (210), generating a query token using a constant provided by the data analyst such that the constant remains hidden from the data owner (220) and analyzing the cipher text using the query token (230). Process 200 may include outputting one or more identity query tokens as a result of analyzing the cipher text (240), which then may be used to analyze the cipher text.

For example, the encryption generator 104 may be configured to generate the cipher text and to send the cipher text over the network 108 to the data store 110 and/or directly to the analysis engine 114 for use by the data analyst. The data owner's data is encrypted by the encryption generator 104 using the secret key generated by the key generator 102, where the secret key is kept secret by the data owner such that it is not revealed to the data analyst.

The query generator 112 may be configured to generate one or more query tokens using the constant provided by the data analyst such that the constant remains hidden from the data owner (220). In one exemplary implementation, generating the query token may be an interactive protocol between the data owner and the data analyst such that the data owner is providing an input of the secret key to the query generator 112 and the data analyst is inputting the constant and the public parameter.

The query tokens that are output from the query generator 112 may be used as input to the analysis engine 114 to analyze the cipher text (230). The analysis engine 114 enables the data analyst to search the cipher text using different types of query tokens and different types of searches to carry out, for example, a financial audit or other type of data analysis for the data owner without revealing any search methodologies.

Figure 3:
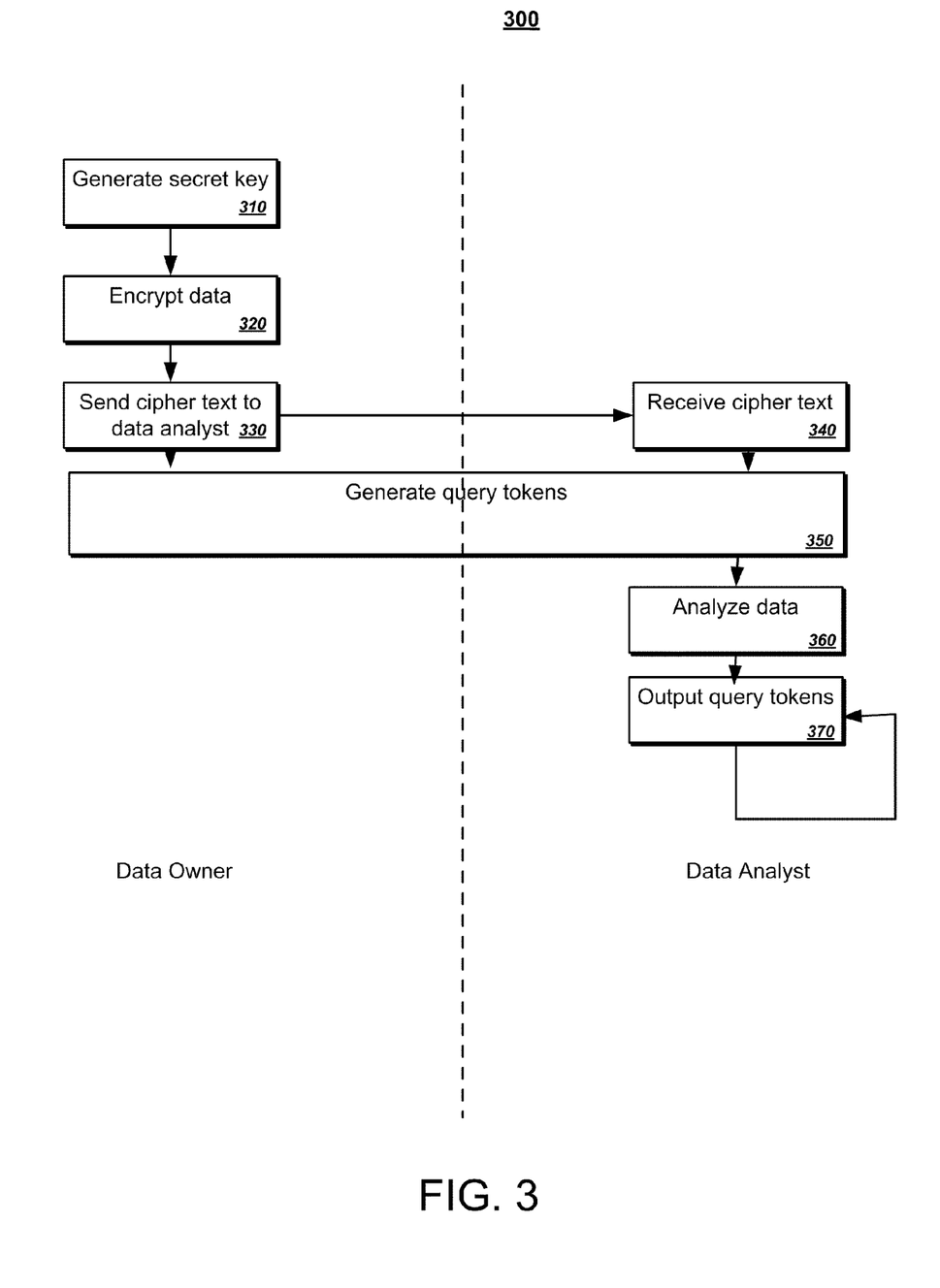
FIG. 3 is a swim lane diagram illustrating example operations of the system of FIG. 1.

Referring to FIG. 3, an exemplary swim lane diagram 300 illustrates example operations of the system 100 of FIG. 1. The diagram 300 illustrates various operations as they may be performed by the data owner and/or the data analyst. For example, the data owner may have data that the desire to have analyzed remotely by a data analyst. To protect the integrity and secrecy of the data, the data owner may generate a secret key (310) and use the secret key to encrypt the data (320). As discussed above with respect to FIG. 1, the data may be in many different forms and types. The result of encrypting the data (320) is cipher text. The data owner may communicate the cipher text to the data analyst (330) knowing that the data is secure because the data owner retains the secret key that was used to encrypt the data.

The data analyst receives the cipher text (340) and may store the cipher text in a database such that it may be searched at a later time. The data analyst and the data owner may interactively generate the query tokens (350). As discussed above, the query generator 112 may include a component on the data analyst side and a component on the data owner side. In one exemplary implementation, each of the component may be computer program products, which include instructions that, when executed, cause a data processing apparatus to perform the processing of the query generator 112.

The data analyst may input a constant to the query generator 112 that the data analyst wishes to use in a query to search the cipher text. The query generator 112 may generate a result to hide the constant and the resulting information from the query generator 112 may be sent to the data owner. The data owner may input the secret key to the query generator 112 and the result is sent to the data analyst to input into the query generator 112 to get the query token.

The data analyst may analyze the data (360) by using the query tokens to search the cipher text. The results of the analyze operation produces additional query tokens (370), which may be used to conduct additional searches for further data analysis.

In this manner, the data owner is able to send sensitive data in a secure format to a data analyst so that the data analyst can perform remote searches of the data using constants selected by the data analysts knowing that the constants will remain hidden from the data owner. This enables data analysis to be outsourced remotely in secure ways for both parties in a manner that was not previously possible.

In another exemplary implementation, a data analyst may use the following language for querying the data. Let $t = (d^1, d^2, \ldots, d^n)$ be a n-tuple (row) in the ledger data. Denote $t.d^i$ the i-th data item of row t. For simplicity, a flattened, non-normalized form of the data may be considered, where all data tables have been condensed into one flat table. Let $c^i$ be any constant query string for $t.d^i$. The grammar for a query expression e is as follows:

$$e := e \wedge e | e \vee e | s$$

$$s := t.d^i \text{ op } c^i | t.d^i \text{ op } st'.d^i$$

op:=ops|<|> ops:===

This grammar implies range queries ($c^i$<t.$d^i$∧t.$d^i$<$c^{i'}$ ($c^i$<$c^{i'}$)) and keyword searches ($c^i$==t.$d^i$). We write e t, if e matches the record t. The footprint ($C_{range}$, $C_{id}$, F) of an expression e is its set $C_{range}$ of used constants in range queries, its set $C_{id}$ of used constants in identity queries and its set F of used foreign fields or keys. For example, the query expression t.$d^1$>2∧t.$d^1$<6∧t.$d^2$==4∧t.$d^3$==t'.$d^3$ has the footprint ({2,6}, {4}, {t'.$d^3$}). This query language may represent the queries possible by the data analyst.

As discussed above, the language includes a feature of the encryption scheme, namely the comparing for equality the data items of two tuples. If a query has returned a set of tuples, each data item in this tuple can be used in subsequent keyword searches without the loss of privacy. This feature may be referred to as query result reusability.

Another feature of the encryption system is that queries are not revealed to the encrypting party. Nevertheless the querying party can search for any range it chooses. In a completely non-interactive system these are conflicting goals. If the querier can (non-interactively) search for any range he intends to, the querier may be able to binary search for the encrypted value and thereby break any encryption secure against a polynomially-bound adversary.

In the exemplary encryption system, the translation of constants into query tokens may be an interactive protocol, where the interactive protocol does not reveal its inputs. The query token protocol for the querier is a privacy-preserving protocol that protects the constant from the encrypting party (and the secret key from the querier). The encryption scheme preserves the privacy of the query.

In this exemplary implementation, a searchable encryption scheme may include the following polynomial-time algorithms or protocols:

1. Setup(k, Γ): The setup algorithm takes a security parameter k and tuple definition Γ and outputs a secret key $K_{DO}$ at the data owner and a public security parameter P.

2. Encrypt($K_{DO}$, t): The encrypt algorithm takes a secret key $K_{DO}$ and a tuple t (adhering to Γ) and outputs a ciphertext C.

3. PrepareRangeQuery[($c_{range}^i$, $c'_{range}^i$), ($K_{DO}$)]: This is a protocol between the data analyst DA and the data owner DO. The analyst inputs a range from $c_{range}^i$ to $c'_{range}^i$ and the owner inputs a secret key $K_{DO}$. The output at the analyst is a range query token $Q_{range}$ and the data owner receives no output. The protocol hides the inputs, such that the analyst will learn nothing about $K_{DO}$ and the data owner nothing about $c_{range}^i$, and $c'_{range}^i$.

4. PrepareIdentityQuery[($c_{id}^i$), ($K_{DO}$)]: This is a protocol between the data analyst DA and the data owner DO. The analyst inputs a constant $c_{id}^i$ and the owner inputs a secret key $K_{DO}$. The output at the analyst is an identity query token $Q_{id}$ and the data owner receives no output. The protocol hides the inputs, such that the analyst will learn nothing about $K_{DO}$ and the data owner nothing about $d_{id}^i$.

5. Analyze(C, $Q_{range}$, $Q_{id}$, e): This protocol takes a ciphertext C, a set of range query tokens $Q_{range}$, a set of identity query tokens $Q_{identity}$ and a query expression e and outputs a set $Q'_{id}$ of identity query tokens.

For the encryption scheme to be searchable, a consistency constraint may be used. For each tuple t=($c^1$, $c^2$, ..., $c^n$) (defined by Γ) and each query expression e with footprint ($G_{range}$, $c_{id}$ F), the above scheme should satisfy the consistency constraint below:

Analyze(C, $Q_{range}$, $Q_{id}$, e) =
$$\begin{cases} \begin{cases} PrepareIdentityQuery[(c), (K_{DO})] \mid \\ \forall c \in \{c^1, c^2, \ldots, c^n\} \end{cases} & \text{if } e t \\ \bot & w.h.p., \text{otherwise} \end{cases}$$

where

P, $K_{DO}$ = Setup(k, Γ)

C = Encrypt($K_{DO}$, t)

$Q_{range} \supset \begin{cases} PrepareRangeQuery[(c, c'), (K_{DO})] \mid \\ c, c' \in C_{range} \end{cases}$ $Q_{id} \supset \{PrepareIdentityQuery[(c), (K_{DO})] \mid c \in C_{id} \cup F\}$ In what follows in the document, $Z_p^* = \{1, \ldots, p-1\}$.

Given a security parameter k, let $G_1$, $G_2$ and $G_T$ be groups of order q for some large prime q, where the bit-size of q is determined by the security parameter k. The schemen may use a computable, non-degenerate bilinear map ê: $G_1 \times G_2 \to G_T$ for which the Symmetric External Diffie-Hellman (SXDH) problem is assumed to be hard. The SXDH assumption allows for the existence of a bilinear pairing, but assumes that the Decisional Diffie-Hellman problem is hard in both $G_1$ and $G_2$.

A bilinear map satisfies the following three properties:
Bilinear: for g∈$G_1$, h∈$G_2$ and for a, b∈$Z_p^*$ $ê(g^a, h^b) = ê(g,h)^{ab}$ Non-degenerate: ê(g,h)≠1 is a generator of $G_T$
Computable: there exists an efficient algorithm to compute ê(g,h) for all g∈$G_1$ and h∈$G_2$ The encryption scheme and protocol may include the use of an identity-based encryption (IBE) scheme. The IBE scheme requires the SXDH assumption discussed above to hold. A standard hash function may be used that maps strings onto group elements.

In one exemplary implementation, the IBE scheme may include the following algorithms:

Setup(k): Let H be a one way hash function defined from $\{0,1\}^*$ to $G_2$. The public parameters are g∈$G_1$, $g_\alpha = g^\alpha$, h∈$G_2$. The secret parameter is α.

Encrypt($x_{id}$, m): Choose $r \xleftarrow{R} Z_p^*$.

$C = \langle ê(g_\alpha, h)^s m, g^s, H(x_{id})^s \rangle$

GetPrivateKey($x_{id}$, α): Choose $r \xleftarrow{R} Z_p^*$.

$k_{id} = \langle h^\alpha H(x_{id})^r, g^r \rangle$

Figure 4:
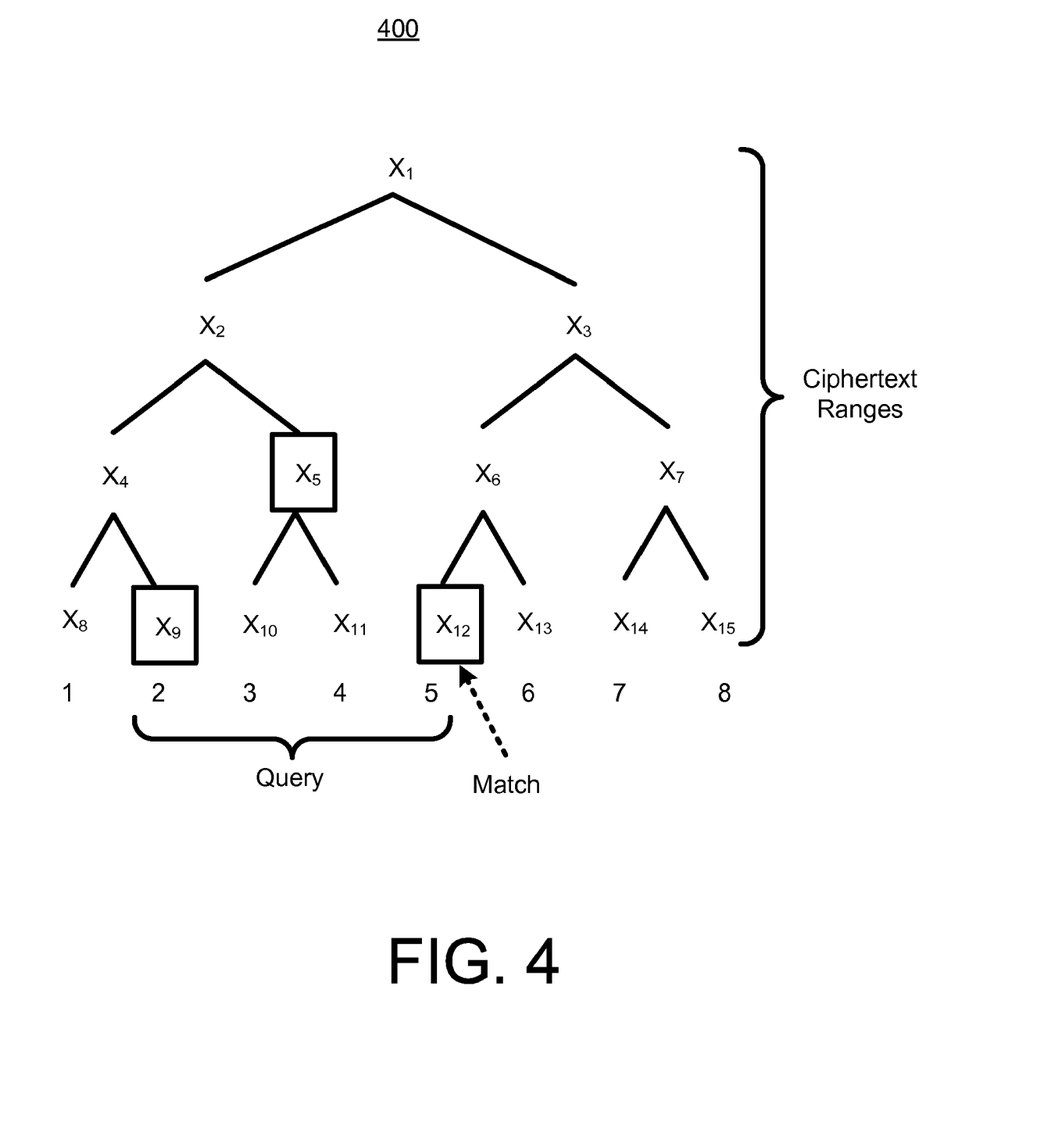
FIG. 4 is a diagram illustrating example ranges on an exemplary binary tree.

Decrypt(C, $k_{id}$):

$ê(g_\alpha, h)^s m \frac{ê(g^r, H(x_{id})^s)}{ê(g^s, h^\alpha H(x_{id})^r)} = m$ Referring to FIG. 4, an exemplary binary tree 400 is illustrated. Let $D=[d_1,d_2]$ be the domain of c. As illustrated in FIG. 4, the elements of D are organized in ascending order as the leaves of a binary tree. Binary tree 400 shows the exemplary binary tree that is created when $D=[1,8]$. Each element is labeled with an identity. This way $O(|D|)$ intervals are identified, where each node defines an interval comprised of all the elements of D that are the leaves of the subtree rooted at the node itself. For instance, with reference to FIG. 4, $x_2$ identifies the interval [1,4]. With combinations of such intervals, any range in the domain D may be identified. For instance, the interval [2,5] is identified by the union of $x_9$, $x_5$ and $x_{12}$. In this manner, the data analyst may query each interval in a separate protocol and later compose the result with an ∧join.

Referring back to FIG. 1, the key generator 102 may be used by the data owner as part of the setup and generation of the public and private key(s). For the Setup(k, Γ), the data owner (DO) sets up the IBE scheme, as discussed above. The DO also picks $$t_{DO} \xleftarrow{R} Z_p^*$$

and publishes $h^{t_{DO}}$. The DO also creates a binary tree $T_D$ for the domain D and makes the identifiers of each node public. In this exemplary implementation, the key generator 102 may be arranged and configured to set up the IBE scheme and to create the binary tree (e.g., binary tree 400 of FIG. 4) for the domain.

Figure 5:
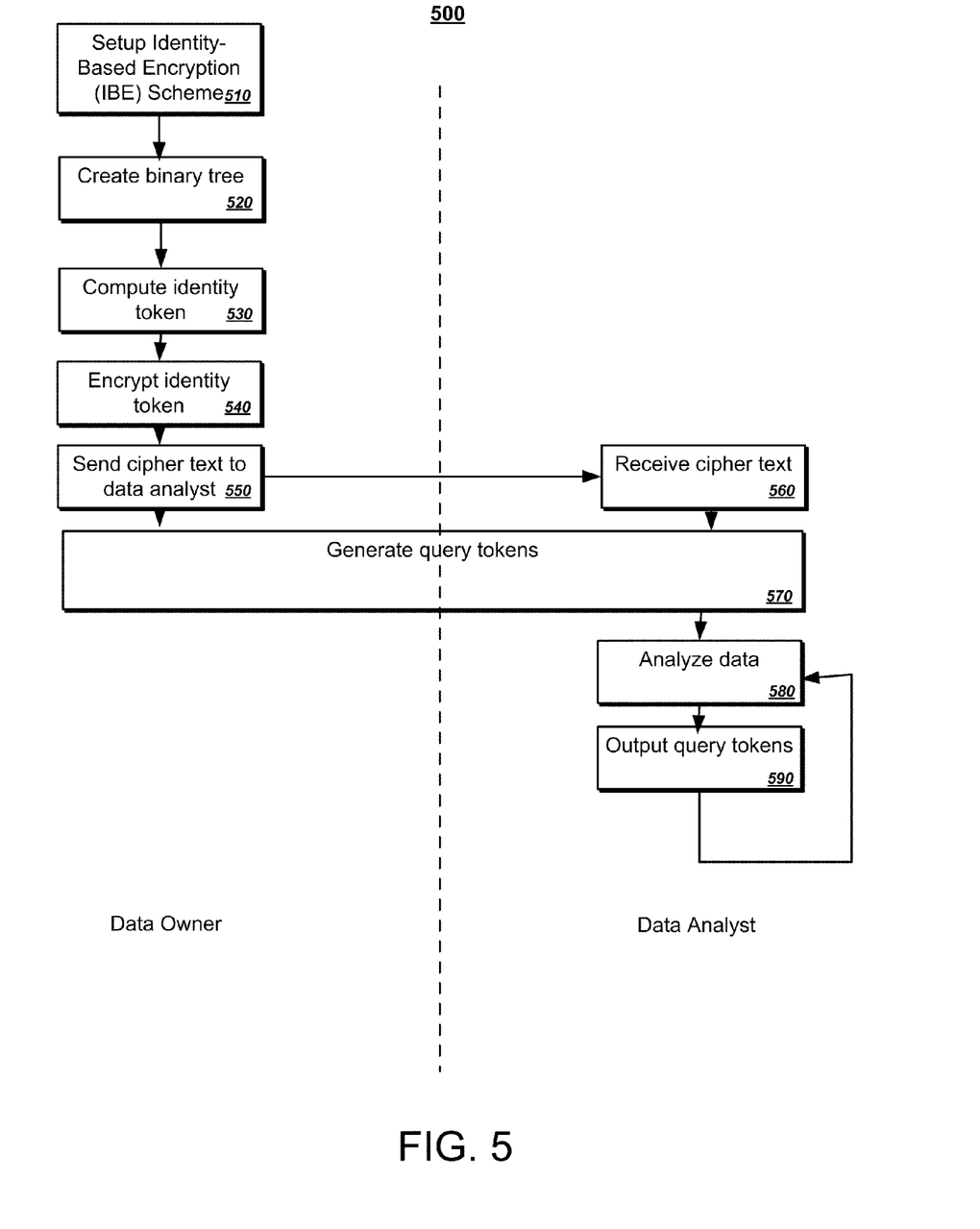
FIG. 5 is a swim lane diagram illustrating example operations of the system of FIG. 1.

Referring also to FIG. 5, an exemplary swim lane diagram 500 illustrates example operations of the system 100 of FIG. 1. For the setup, the data owner may setup the IBE scheme (510), for instance, using the key generator 102. The data owner also creates the binary tree for the domain and makes the identifiers of each node public (520).

The encryption generator 104 may be used by the data owner to encrypt the data. For the Encrypt($K_{DO}$, t), the data owner DO picks $$s \xleftarrow{R} Z_p^*$$

and computes the identity token (530):

$$ID_t = \langle H(t)^{st_{DO}}, g^s \rangle$$

The DO then selects from $T_D$ the $O(\log n)$ identities $X_t = \{x_i:$ nodei is in the path from t to the root$\}$ for all ranges from the leaf corresponding to t up to the top of the tree. With reference to FIG. 4, if t=5, the considered identities would be $x_{12}$, $x_6$, $x_3$ and $x_1$. Note that in case of a match between range query and plaintext, there is one and only one range (identity) in common between query and ciphertext. Then, the DO IBE-encrypts $ID_t$ under all the identities in $X_t$ (540). The data owner sends the cipher text to the data analyst (550) and the cipher text is received by the data analyst (560). For example, after the encryption, the DO returns $ID_t$ along with its log n IBE encryptions.

The query generator 112 may be used for the PrepareIdentityQuery[$(c_{id}^i)$, $(K_{DO})$] operation. For example, the data analyst desires to generate query tokens (570). In one example for an identity query, the DA wants to request an identity token for a value $c_{id}^i \in D$. The data analyst picks $$r \xleftarrow{R} Z_p^*,$$

and sends $H(c_{id}^i)^r$ to the DO. The DO picks $$s \xleftarrow{R} Z_p^*$$

and replies with $(c_{id}^i)^r)^{st_{DO}}$, $g^s$. The DA computes $(H(c_{id}^i)^{rst_{DO}})^{r^{-1}}$, thus obtaining the identity token for $c_{id}^i$ $$ID_{c_{id}^i} = \langle H(c_{id}^i)^{st_{DO}} g^s \rangle$$

In another example, the query generator 112 may be used for the PrepareRangeQuery[$(c_{range}^i, c'_{range}^i)$, $(K_{DO})$] operation. For example, the data analyst desires to generate query tokens (570). The data analyst DA wants to obtain a range query token for a single range $[c_{range}^i, c'_{range}^i]$ with the binary tree of ranges. The DA consequently chooses the identity $x_r$ that represents such a range. The DA chooses one $$r \xleftarrow{R} Z_p^*$$

and sends $H(x_r)^r$ and $h^r$ to the data owner DO. After receiving the identity, the DO picks $$s \xleftarrow{R} Z_p^*.$$

Then, the DO returns to the DA $$\langle h^{r\alpha} H(x_r)^{rs}, g^s \rangle$$

Upon receipt, the DA raises the first term to the multiplicative inverse of r, thus obtaining the following IBE decryption key for identity $H(x_r)$:

$$k_{x_r} = \langle h^{\alpha} H(x_r)^s, g^s \rangle$$

The resulting complexity for a single range is $O(\log D)$. For complex range queries, the DA may request each range individually and combine the results. There may be at most $O(\log D)$ ranges that need to be combined resulting in a complex range query complexity $O(\log^2 D)$.

The analysis engine 114 may be used by the DA for the Analyze(C, $Q_{range}$, $Q_{id}$, e) operation. For example, the DA may analyze data (580) using both range queries and identity queries. For range queries, the DA decrypts each IBE encryption of $ID_t$ with each IBE decryption key received from the DO upon his query. If any decrypts to $ID_t$, then the match was successful.

For identity queries, the DA owns (a set of) $ID_y$ for some queried value y. The DA can check for equality of any tuple t, disposing of $ID_t = \langle H(t)^{st_{DO}}, g^s \rangle$ and $ID_y = \langle H(y)^{rt_{DO}}, g^r \rangle$ by checking whether $$\hat{e}(g^r, H(t)^{st_{DO}}) = \hat{e}(g^s, H(y)^{rt_{DO}})$$

holds. If it does, the DA can conclude that the match was successful.

The results of either a range query or an identity query may be reused in subsequent queries (590). In one exemplary implementation, the results of those queries can be re-used in subsequent queries as identity query tokens.

In one exemplary implementation, the encryption scheme supports multi-dimensional database tuples of the form $t=\langle c^1, c^2, \ldots, c^n\rangle$ For example, let $D_i$ be the range of $t.c^i$. The data owner, DO, publishes n non-overlapping binary trees $T_{D_i}$ of ranges, i.e. $|\cup_{i=1}^n T_{D_i}|=\Sigma_{i=1}^n|T_{D_i}|$. The DO also chooses n secret keys $t_{DO}{}^i$ and publishes each $h^{t_{DO}{}^i}$. If two dimensions i and i' are supposed to be cross-searched, i.e. a token for dimension i can search in dimension i' and vice-versa, the DO may select the same $t_{DO}{}^i = t_{DO}{}^{i'}$ for both i and i'. Then, the DO chooses n $$s_i \xleftarrow{R} Z_p^*$$

and computes $ID_{t_i} = \langle H(t.c^i)^{s_i t_{DO}}, g^{s_i}\rangle$ These serve as the ciphertext for identity queries.

The DO then encrypts each $ID_{t_i}$ using the ranges from $T_{D_i}$. If the key space of the IBE encryption scheme is insufficient for all ranges of all columns, the DO can setup a new IBE public parameter for additional columns. The key size for the encryption scheme may remains at $O(|t|)$.

In the analyze algorithm of the encryption scheme, the data analyst, DA, then searches with a range query token for the identities of a particular $t.c^i$. If the decrypted plaintext matches $ID_{t_i}$, the DA can use all identity ciphertexts as identity query tokens. Similarly with identity queries, the DA compares the identity query token to a particular $ID_{t_i}$ and uses all of them in case of a match.

The encryption scheme also supports the full grammar G not only simple range or identity queries, as described in the Analyze (PP, C, RQ, IQ, expr) algorithm. The data analyst first breaks the query into simple queries of the form described connected by the binary operators $\wedge$ or $\vee$. The data analyst may need to obtain range query tokens for virtual lowest $-\infty$ and upmost elements $\infty$ to augment range queries of the form $t.d^i < c^i$ or $t.d^i > c^i$ with $t.d^i > -\infty$ or $t.d^i < \infty$, respectively, that cannot be combined otherwise. The data analyst then executes all simple range queries obtaining a result set $\Omega_j$ for each simple query expression $expr_j$.

Next, the data analyst combines the sets such that for two query expressions expr and expr' connected by a $\wedge$ operation, the data analyst computes the combined result set $\Omega \wedge = \Omega \cap \Omega'$. For two query expressions expr and expr' connected by a $\vee$ operation, the data analyst computes the combined result set $\Omega \vee = \Omega \cup \Omega'$. The final result set $\Omega^*$ that combines all query expressions is the result of the complex query.

In this exemplary complex query scenario, the data analyst can always issue parts of the each complex query without additional approval by the data owner and gain the information revealed by the complex query.

Implementations of the various techniques described herein may be implemented in digital electronic circuitry, or in computer hardware, firmware, software, or in combinations of them Implementations may be implemented as a computer program product, i.e., a computer program tangibly embodied in an information carrier, e.g., in a machine-readable storage device, for execution by, or to control the operation of, data processing apparatus, e.g., a programmable processor, a computer, or multiple computers. A computer program, such as the computer program(s) described above, can be written in any form of programming language, including compiled or interpreted languages, and can be deployed in any form, including as a stand-alone program or as a module, component, subroutine, or other unit suitable for use in a computing environment. A computer program can be deployed to be executed on one computer or on multiple computers at one site or distributed across multiple sites and interconnected by a communication network.

Method steps may be performed by one or more programmable processors executing a computer program to perform functions by operating on input data and generating output. Method steps also may be performed by, and an apparatus may be implemented as, special purpose logic circuitry, e.g., an FPGA (field programmable gate array) or an ASIC (application-specific integrated circuit).

Processors suitable for the execution of a computer program include, by way of example, both general and special purpose microprocessors, and any one or more processors of any kind of digital computer. Generally, a processor will receive instructions and data from a read-only memory or a random access memory or both. Elements of a computer may include at least one processor for executing instructions and one or more memory devices for storing instructions and data. Generally, a computer also may include, or be operatively coupled to receive data from or transfer data to, or both, one or more mass storage devices for storing data, e.g., magnetic, magneto-optical disks, or optical disks. Information carriers suitable for embodying computer program instructions and data include all forms of non-volatile memory, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory may be supplemented by, or incorporated in special purpose logic circuitry.

To provide for interaction with a user, implementations may be implemented on a computer having a display device, e.g., a cathode ray tube (CRT) or liquid crystal display (LCD) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input.

Implementations may be implemented in a computing system that includes a back-end component, e.g., as a data server, or that includes a middleware component, e.g., an application server, or that includes a front-end component, e.g., a client computer having a graphical user interface or a Web browser through which a user can interact with an implementation, or any combination of such back-end, middleware, or front-end components. Components may be interconnected by any form or medium of digital data communication, e.g., a communication network. Examples of communication networks include a local area network (LAN) and a wide area network (WAN), e.g., the Internet.

While certain features of the described implementations have been illustrated as described herein, many modifications, substitutions, changes and equivalents will now occur to those skilled in the art. It is, therefore, to be understood that the appended claims are intended to cover all such modifications and changes as fall within the scope of the embodiments.

What is claimed is:

1. A method for performing data analytics on outsourced data, the method comprising:
   generating, by data owner's workstation, a binary tree representing data from the data owner, wherein each node of the binary tree is associated with an identity that represents a data element or an interval of data elements;

computing, by the data owner's workstation, an identity token and encrypting the identity token for each of the identities in the binary tree;

generating a range query token using an identity selected by a data analyst and a secret key input by the data owner and computing a decryption key for the selected identity; and analyzing the data, at the data analyst's workstation, by comparing the computed decryption key for the selected identity with each of the encrypted identities.

2. The method as in claim 1 further comprising generating an identity query token using an encrypted constant selected by the data analyst and the secret key input by the data owner and computing the identity query token.

3. The method as in claim 2 further comprising analyzing the data, by the data analyst, by comparing the identity query token with each of the encrypted identities.

4. The method as in claim 1 further comprising outputting one or more identity query tokens as a result of analyzing the data.

5. The method as in claim 1 wherein encrypting the identity token for each of the identities in the binary tree uses an identity-based encryption scheme.

6. The method as in claim 5 wherein the identity-based encryption scheme uses hash functions that map strings onto group elements.

7. The method as in claim 4 further comprising analyzing the data using the outputted identity query tokens.

8. A microprocessor-based digital computer system for performing data analytics on outsourced data, comprising:
a processor;
a memory containing instructions for:
a key generator that is arranged and configured to generate a binary tree representing data from a data owner, wherein each node of the binary tree is associated with an identity that represents a data element or an interval of data elements;
an encryption generator that is arranged and configured to compute an identity token and encrypt the identity token for each of the identities in the binary tree;
a query generator that is arranged and configured to generate a range query token using an identity selected by a data analyst and a secret key input by the data owner and computing a decryption key for the selected identity; and
an analysis engine that is arranged and configured to analyzing the data by comparing the computed decryption key for the selected identity with each of the encrypted identities.

9. The microprocessor-based digital computer system of claim 8 wherein the query generator is arranged and configured to generate an identity query token using an encrypted constant selected by the data analyst and the secret key input by the data owner and compute the identity query token.

10. The microprocessor-based digital computer system of claim 9 wherein the analysis engine is further arranged and configured to analyze the data by comparing the identity query token with each of the encrypted identities.

11. The microprocessor-based digital computer system of claim 8 wherein the analysis engine is further arranged and configured to output one or more identity query tokens as a result of analyzing the data.

12. The microprocessor-based digital computer system of claim 8 wherein the encryption generator is arranged and configured to encrypt the identity token for each of the identities in the binary tree using an identity-based encryption scheme.

13. The microprocessor-based digital computer system of claim 12 wherein the identity-based encryption scheme uses hash functions that map strings onto group elements.

14. A computer program product for performing data analytics on outsourced data, the computer program product being tangibly embodied on a non-transitory computer-readable medium and including executable code that, when executed, is configured to cause a data processing apparatus to:
generate a binary tree representing data from a data owner, wherein each node of the binary tree is associated with an identity that represents a data element or an interval of data elements;
compute an identity token and encrypting the identity token for each of the identities in the binary tree;
generate a range query token using an identity selected by a data analyst and a secret key input by the data owner and compute a decryption key for the selected identity; and
analyze the data by comparing the computed decryption key for the selected identity with each of the encrypted identities.

15. The computer program product of claim 14 embodied on the non-transitory computer-readable medium further comprising executable code that, when executed, causes the data processing engine to generate an identity query token using an encrypted constant selected by the data analyst and the secret key input by the data owner and compute the identity query token.

16. The computer program product of claim 15 embodied on the non-transitory computer-readable medium further comprising executable code that, when executed, causes the data processing engine to analyze the data by comparing the identity query token with each of the encrypted identities.

17. The computer program product of claim 14 embodied on the non-transitory computer-readable medium further comprising executable code that, when executed, causes the data processing engine to output one or more identity query tokens as a result of analyzing the data.

18. The computer program product of claim 14 embodied on the non-transitory computer-readable medium wherein the executable that, when executed, causes the data processing engine to encrypt the identity token for each of the identities in the binary tree uses an identity-based encryption scheme.

19. The computer program product of claim 18 embodied on the non-transitory computer-readable medium wherein the identity-based encryption scheme uses hash functions that map strings onto group elements.

20. The computer program product of 17 embodied on the non-transitory computer-readable medium further comprising executable code that, when executed, causes the data processing engine to analyze the data using the outputted identity query tokens.

* * * * *